(No Model.)
R. C. NUGENT.
REIN HOLDER.
No. 458,661. Patented Sept. 1, 1891.
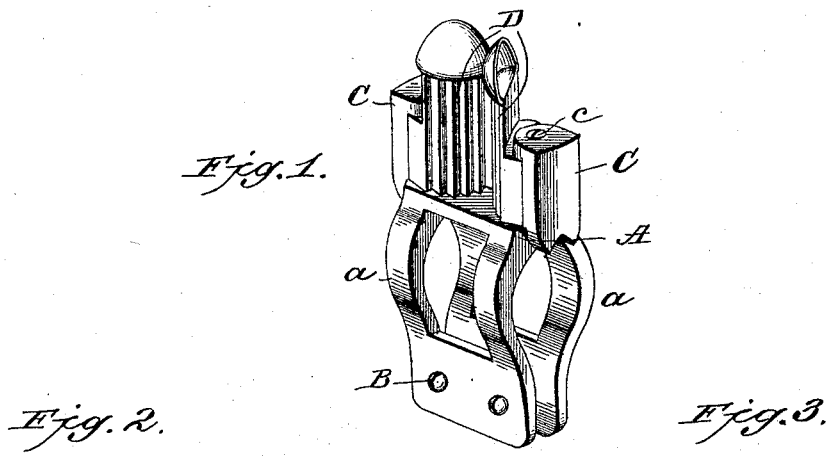
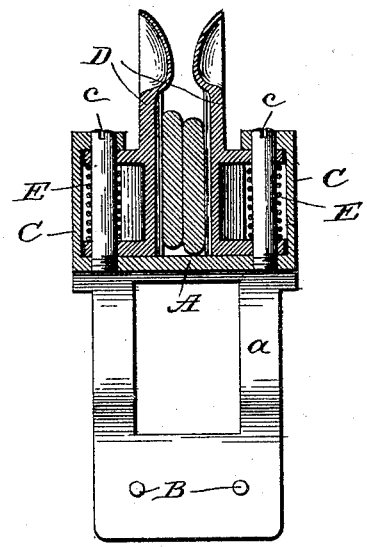
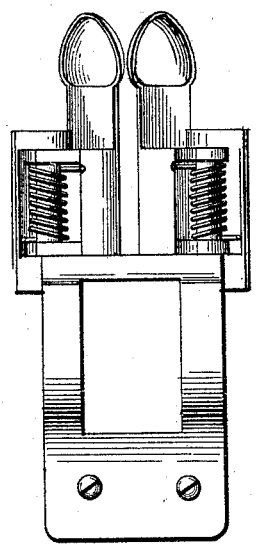
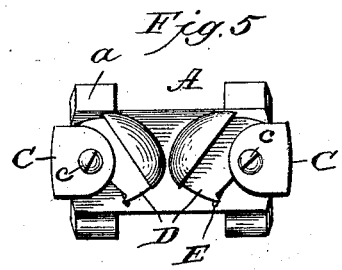
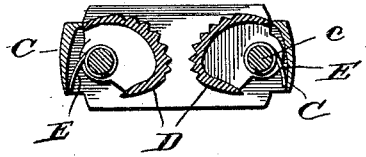
WITNESSES:
INVENTOR
Richard C. Nugent,
BY
Church & Church
HIS ATTORNEYS

UNITED STATES PATENT OFFICE.

RICHARD C. NUGENT, OF HARRISBURG, PENNSYLVANIA, ASSIGNOR OF ONE-HALF TO MAURY D. JENKINS, OF SAME PLACE.

REIN-HOLDER.

SPECIFICATION forming part of Letters Patent No. 458,661, dated September 1, 1891.

Application filed December 22, 1890. Serial No. 375,529. (No model.)

*To all whom it may concern:*

Be it known that I, RICHARD C. NUGENT, of Harrisburg, in the county of Dauphin and State of Pennsylvania, have invented certain new and useful Improvements in Rein-Holders; and I do hereby declare the following to be a full, clear, and exact description of the same, reference being had to the accompanying drawings, forming a part of this specification, and to the letters of reference marked thereon.

This invention relates to improvements in devices such as are applied to the dashboard or other portion of a vehicle to hold the reins; and it has for its object to provide a device with which the reins can be readily engaged or disengaged by the driver, but from which it will be practically impossible for the horse to pull or otherwise release them.

The invention consists in certain novel details of construction and combinations and arrangements of parts to be hereinafter described, and pointed out particularly in the claims at the end of this specification.

Referring to the accompanying drawings, Figure 1 is a perspective view of a rein-holder constructed in accordance with my invention adapted for application to the dashboard of a buggy or similar vehicle. Fig. 2 is a vertical sectional view with the reins in place. Fig. 3 is a rear elevation. Fig. 4 is a horizontal section, and Fig. 5 is a top plan view of the device.

Like letters of reference in the several figures indicate the same parts.

The body A of the device may be made of any suitable material—such as cast-iron—with arms for attachment to the part of the vehicle where it is desired to secure the device. In the form shown, which is adapted to be applied to the dashboard of a carriage, the lower portion is bifurcated, forming arms *a* *a*, which are bowed at the top to fit around the head on the dashboard. They have a central cut-away portion to give greater elasticity to the arms, so that they may be sprung into position without danger of breakage, and the ends of the arms are drawn together or secured by set-screws B, as shown. Two upwardly-extending projections C C are formed on the body A, and within the housings formed by the bent ends of these projections are pivoted the rein-retaining cams D, each hollowed out around its pivotal screw *c* and having the spring E for keeping the cams pressed forward in operative position, but which will permit them to yield when the reins are inserted, withdrawn, or pulled toward the driver. The general construction of these cams is common in this form of device; but as heretofore made difficulty was experienced by reason of the fact that the reins could be knocked or worked upward by the switching of the horse's tail, or otherwise, and hence the device lacked that element of absolute security necessary to its successful adoption. This difficulty I propose to overcome by locating yielding retaining-shoulders above the cams, which shoulders will retain the reins in place between the cams unless intentionally and positively drawn upward by the driver. These yielding shoulders may be used, of course, in connection with any well-known form of rein-holding cams or equivalent; but in the preferred construction, which is shown in the drawings, they are formed by hemispherical projections H, mounted directly on the upper ends of the cams themselves. The curved surfaces are toward each other and at the bottom are somewhat more abrupt than at the top. Hence the reins may be easily and quickly inserted by being pressed downward between the said surfaces and cams, and can be easily disengaged by a positive upward and backward movement, it being impossible, however, to cause their disengagement by any movement the horse may make.

Having thus described my invention, what I claim as new is—

1. In a rein-holder, the combination, with the body having means for attachment to the vehicle, of the rein-holding cams pivoted on the body and the retaining-shoulders on the upper ends of the cams, substantially as described.

2. In a rein-holder, the combination, with the body having means for attachment to the vehicle, of the rein-holding cams pivoted on said body and the hemispherical projections on the upper ends of the cams having their curved faces toward each other, whereby retaining-shoulders and inclined surfaces to facilitate the entry of the reins are formed, substantially as described.

RICHARD C. NUGENT.

Witnesses:
H. C. JENKINS,
A. S. HASBOLT.